United States Patent
Sakai et al.

(10) Patent No.: US 9,464,200 B2
(45) Date of Patent: Oct. 11, 2016

(54) PIGMENT FOR INK-JET RECORDING, PIGMENT INK FOR INK-JET RECORDING, AND METHOD FOR PRODUCING PIGMENT FOR INK-JET RECORDING

(71) Applicant: BROTHER KOGYO KABUSHIKI KAISHA, Nagoya-shi, Aichi (JP)

(72) Inventors: Jun Sakai, Nagoya (JP); Masayoshi Fuji, Nagoya (JP); Chika Takai, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 14/632,826

(22) Filed: Feb. 26, 2015

(65) Prior Publication Data
US 2015/0259550 A1 Sep. 17, 2015

(30) Foreign Application Priority Data

Mar. 17, 2014 (JP) .................. 2014-053901

(51) Int. Cl.
| | |
|---|---|
| C09D 11/322 | (2014.01) |
| C09C 1/30 | (2006.01) |
| C08K 9/06 | (2006.01) |
| C08K 9/02 | (2006.01) |
| C09C 1/40 | (2006.01) |
| C09C 3/06 | (2006.01) |
| C09D 17/00 | (2006.01) |
| D06P 5/30 | (2006.01) |
| B01J 13/02 | (2006.01) |
| D06P 1/00 | (2006.01) |
| D06P 1/44 | (2006.01) |

(52) U.S. Cl.
CPC .............. *C09D 11/322* (2013.01); *B01J 13/02* (2013.01); *C08K 9/02* (2013.01); *C08K 9/06* (2013.01); *C09C 1/309* (2013.01); *C09C 1/3054* (2013.01); *C09C 1/405* (2013.01); *C09C 1/407* (2013.01); *C09C 3/063* (2013.01); *C09D 17/00* (2013.01); *D06P 1/0016* (2013.01); *D06P 1/44* (2013.01); *D06P 5/30* (2013.01); *C01P 2004/64* (2013.01); *C01P 2004/84* (2013.01); *C01P 2006/11* (2013.01); *C01P 2006/62* (2013.01)

(58) Field of Classification Search
CPC ................................................ C09D 11/332
USPC .................................................. 523/160, 161
See application file for complete search history.

(56) References Cited

U.S. PATENT DOCUMENTS

| | | | |
|---|---|---|---|
| 5,248,556 A * | 9/1993 | Matijevic | C09C 1/3054 106/442 |
| 2007/0249736 A1 | 10/2007 | Watanabe et al. | |
| 2008/0181921 A1 | 7/2008 | DeLuca | |
| 2009/0246674 A1 * | 10/2009 | Carlini | B82Y 30/00 430/110.2 |
| 2012/0232187 A1 * | 9/2012 | Goparaju | C09C 1/3661 523/218 |
| 2012/0329940 A1 * | 12/2012 | Shimanaka | C09C 3/12 524/547 |
| 2014/0011954 A1 * | 1/2014 | Tokoro | C01B 33/18 524/850 |

FOREIGN PATENT DOCUMENTS

| | | |
|---|---|---|
| JP | 2009-096685 A | 5/2009 |
| JP | 2010-507009 A | 3/2010 |

OTHER PUBLICATIONS

WO 2012/168913, Albertin et al, Dec. 13, 2012.*
Extended European Search Report issued in the corresponding European Patent Application No. 15156905.0 dated Jul. 31, 2015.
Wang C et al. "A facile method for the preparation of titania-coated magnetic porous silica and its photocatalytic activity under UV or visible light", Colloids and Surfaces A, Physicochem and Engineering Aspects, vol. 360, No. 1-3, 2010, pp. 184-189.

* cited by examiner

*Primary Examiner* — Doris Lee
(74) *Attorney, Agent, or Firm* — Fox Rothschild LLP (57) ABSTRACT

A pigment for ink-jet recording contains a porous particle, a sealing agent, and an inorganic pigment layer containing an inorganic pigment. The sealing agent is arranged in a pore opening of the porous particle. The inorganic pigment layer is formed on the surface of the porous particle.

15 Claims, 5 Drawing Sheets

PIGMENT FOR INK-JET RECORDING, PIGMENT INK FOR INK-JET RECORDING, AND METHOD FOR PRODUCING PIGMENT FOR INK-JET RECORDING

CROSS-REFERENCE TO RELATED APPLICATION

This application claims priority from Japanese Patent Application No. 2014-053901 filed on Mar. 17, 2014. The entire subject matter of the Japanese Patent Application is incorporated herein by reference.

BACKGROUND

As an inorganic pigment for use in a pigment ink, a multilayer pigment obtained by coating a base material such as titanium oxide or $SiO_2$ with layers each having a high refractive index such as $TiO_2$ is known.

SUMMARY

The pigment for ink-jet recording comprises: a porous particle; a sealing agent; and an inorganic pigment layer comprising an inorganic pigment, the sealing agent is arranged in a pore opening of the porous particle, and the inorganic pigment layer is formed on the surface of the porous particle.

The pigment for ink-jet recording comprises: a porous particle; and an inorganic pigment layer comprising an inorganic pigment, the inorganic pigment layer is formed on the surface of the porous particle, and the inorganic pigment is not present in a pore opening of the porous particle inside the inorganic pigment layer.

DETAILED DESCRIPTION

In the present invention, "the inorganic pigment is not present in a pore opening of the porous particle" encompasses the case where "the inorganic pigment is not substantially present in a pore opening of the porous particle". "The inorganic pigment is not substantially present in a pore opening of the porous particle" means that the pigment for ink-jet recording may contain a small amount of the inorganic pigment in the pore opening within the favorable range of the pigment density described below.

As mentioned above, the pigment for ink-jet recording comprises: a porous particle; a sealing agent; and an inorganic pigment layer comprising an inorganic pigment, the sealing agent is arranged in a pore opening of the porous particle, and the inorganic pigment layer is formed on the surface of the porous particle.

Examples of the porous particle include a porous silicon oxide particle such as porous silica ($SiO_2$) particle, a porous alminosilicate particle such as zeolite, a porous aluminium oxide particle, a porous zirconium oxide particle, and active carbon, and the porous particle is, for example, a porous silica particle.

The sealing agent is not particularly limited as long as it is arranged in a pore opening of the porous particle and is, for example, a chemical compound of organic silicon. Examples of the chemical compound of organic silicon include alkoxysilane such as tetraethoxysilane (TEOS), trialkylmonosilane such as trimethylmonosilane, alkylsilane such as hexamethyldisilane, and fluoroalkylsilane such as a silane coupling agent having a perfluoroalkyl group.

The inorganic pigment is not particularly limited, and examples thereof include titanium oxide, sulfate of alkali earth metal, carbonate of alkali earth metal, silica (for example, fine-powdered silicic acid, synthesized silicate), calcium silicate, alumina, hydrated alumina, zinc oxide, talc, and clay. Any one of them may be used alone, or two or more of them may be used in combination. Among them, the inorganic pigment is, for example, titanium oxide.

The method for producing a pigment for ink-jet recording is described below with reference to (a) to (c) in FIG. 1. The method, however, is merely an example and the pigment for ink-jet recording may be produced by another method.

Figure 1:
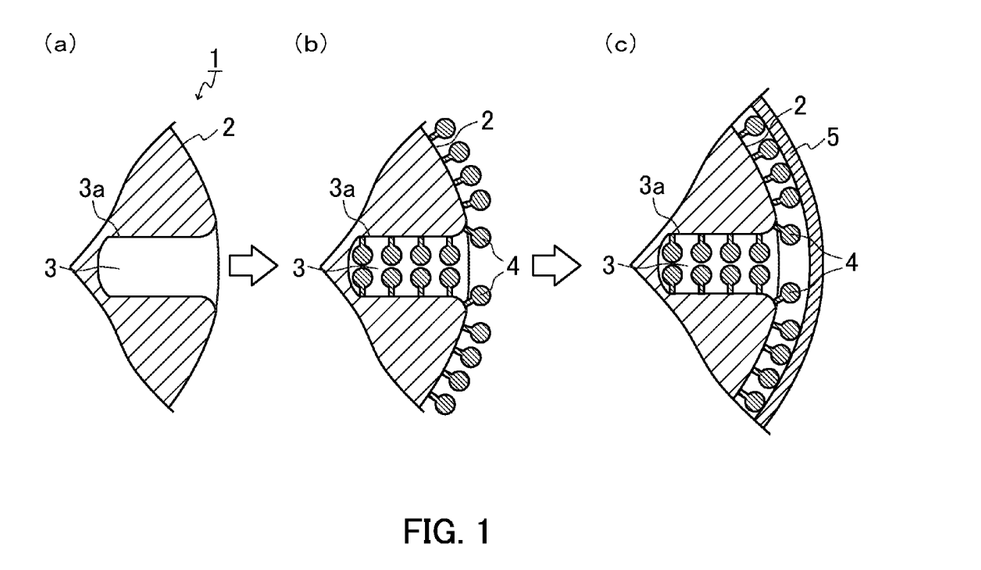
FIG. 1 shows figures describing an example of a method for producing a pigment for ink-jet recording.

As shown in (a) and (b) in FIG. 1, a sealing agent 4 is arranged on the entire surface including the outer peripheral surface 2 of a porous particle 1 and the inner surface 3a of a pore opening 3.

As the porous particle 1, a commercially available porous particle or a self-prepared porous particle may be used. The porous silica particle may be prepared by causing the inside and the surface of an aggregate of ultrafine powder such as calcium carbonate or the like as a base particle (core) to be immersed in and coated with silica, then dissolving the ultrafine powder in acid, and thereafter drying the ultrafine powder, for example.

The arrangement of the sealing agent 4 may be performed by a reflux method or a supercritical method using an autoclave, for example.

Then, as shown in (c) in FIG. 1, the inorganic pigment layer 5 comprising an inorganic pigment is formed on the surface of the porous particle 1. The inorganic pigment layer 5 may be formed by stirring a solution containing the porous particle 1 and the inorganic pigment with ultrasound, then subjecting the solution to centrifugal separation, and thereafter washing, drying, and firing the obtained precipitate, for example. At that time, the sealing agent 4 is arranged in the pore opening 3 of the porous particle 1. Thus, the entering of the inorganic pigment into the pore opening 3 is significantly suppressed, and a hollow pigment with a low density can be obtained.

The density of the pigment for ink-jet recording is, for example, 1.7 $g/cm^3$ to 2.8 $g/cm^3$. With the density range, the sedimentation velocity in a solvent may be about ½ or less of the case where the inorganic pigment is entered into the pore opening 3 of the porous particle 1, and the pore opening 3 is completely filled with the inorganic pigment, and the pigment for ink-jet recording may be further superior in dispersibility in a solvent. Moreover, in the case where titanium oxide is used as the inorganic pigment, the pigment for ink-jet recording with further superior brightness (L*) may be obtained.

The application of the pigment for ink-jet recording is not particularly limited, and the pigment for ink-jet recording may be applied widely in various inks, various paints, and the like as well as a pigment ink for ink-jet recording described below, for example.

Then, a pigment ink for ink-jet recording (hereinafter also referred to as a "pigment ink" or an "ink".) is described below. The pigment ink for ink-jet recording comprises the pigment for ink-jet recording. The pigment ink for ink-jet recording may be used in ink-jet recording on recording paper, a transparent sheet such as an OHP sheet, or the like or may be used in ink-jet recording on fabric.

The amount of the pigment for ink-jet recording to be added in the pigment ink for ink-jet recording is not particularly limited and is, for example, 1 wt % to 25 wt %, 3 wt % to 20 wt %, 5 wt % to 15 wt %, relative to the total amount of the pigment ink.

The pigment ink for ink-jet recording may further contain a coloring agent other than the pigment for ink-jet recording. Examples of the coloring agent other than the pigment for ink-jet recording include a pigment other than the pigment for ink-jet recording and a dye.

The pigment ink for ink-jet recording may further contain a pigment dispersant in order to further improve dispersibility of the pigment. The pigment dispersant may be, for example, a polyacrylic resin. The amount of the pigment dispersant to be added relative to the total amount of the pigment ink is, for example, 0 wt % to 10 wt %, 2 wt % to 7 wt %.

The pigment ink for ink-jet recording may further contain water. The water is, for example, distilled water, ion-exchange water, or pure water. The amount of the water to be added relative to the total amount of the pigment ink for ink-jet recording is, for example, the balance of the pigment ink for ink-jet recording, excluding other components.

The pigment ink for ink-jet recording may further contain a humectant. The humectant prevents the ink from drying at the tip of the ink-jet head, for example. The humectant is not particularly limited, and examples thereof include lower alcohols such as methyl alcohol, ethyl alcohol, n-propyl alcohol, isopropyl alcohol, n-butyl alcohol, sec-butyl alcohol, or tert-butyl alcohol; amide such as dimethylformamide or dimethylacetamide; ketone such as acetone; ketoalcohol such as diacetone alcohol; ether such as tetrahydrofuran or dioxane; polyether such as polyalkylene glycol; polyhydric alcohol such as alkylene glycol, glycerin, or trimethylol propane; 2-pyrrolidone; N-methyl-2-pyrrolidone; and 1,3-dimethyl-2-imidazolidinone. Examples of the polyalkylene glycol include polyethylene glycol and polypropylene glycol. Examples of the alkylene glycol include ethylene glycol, propylene glycol, diethylene glycol, triethylene glycol, dipropylene glycol, tripropylene glycol, thiodiglycol, and hexylene glycol. Any one of them may be used alone, or two or more of them may be used in combination. Among them, the humectant is, for example, polyhydric alcohol such as alkylene glycol or glycerin. The amount of the humectant to be added relative to the total amount of the pigment ink for ink-jet recording is, for example, 0 wt % to 60 wt %, 3 wt % to 50 wt %.

The pigment ink for ink-jet recording may further contain a surfactant. The surfactant may cause the surface tension of the pigment ink for ink-jet recording and the dispersibility of the pigment to be improved. The surfactant is not particularly limited, and examples thereof include: anionic surfactants produced by Kao Corporation such as EMAL® series, LATEMUL® series, VENOL® series, NEOPELEX® series, NS SOAP, KS SOAP, OS SOAP, and PELEX® series; anionic surfactants produced by Lion Corporation such as LIPOLAN® series, LIPON® series, SUNNOL® series, LIPOTAC® TE, ENAGICOL® series, LIPAL® series, and LOTAT® series; nonionic surfactants produced by Kao Corporation such as EMULGEN® series, RHEODOL® series, EMASOL® series, EXCEL® series, EMANON® series, AMIET® series, and AMINON® series; nonionic surfactants produced by Lion Corporation such as DOBANOX® series, LEOCOL® series, LEOX® series, LAOL, LEOCON® series, LIONOL® series, CADENAX® series, LIONON® series, and LEOFAT® series; and cationic surfactants produced by DAI-ICHI KOGYO SEIYAKU CO., Ltd. such as CATIOGEN® ES-OW and CATIOGEN® ES-L. Any one of them may be used alone, or two or more of them may be used in combination. The amount of the surfactant to be added relative to the total amount of the pigment ink for ink-jet recording is, for example, 0 wt % to 2 wt %, 0.01 wt % to 1.5 wt %, 0.01 wt % to 1 wt %.

The pigment ink for ink-jet recording may further contain a conventionally known additive if necessary. Examples of the additive include a pH adjuster, a viscosity modifier, a surface tension modifier, and a mildewproofing agent. Examples of the viscosity modifier include polyvinyl alcohol, cellulose, and a water-soluble resin.

In the case where the pigment ink for ink-jet recording is used in ink-jet recording on fabric, the pigment ink may further contain a resin emulsion.

The resin emulsion is not particularly limited, and examples thereof include an acrylic resin emulsion, an urethane resin emulsion, and a styrene resin emulsion. The resin emulsion is, for example, an acrylic emulsion or an urethane resin emulsion. As the resin emulsion, a commercially available resin emulsion may be used, for example. Any one of them may be used alone, or two or more of them may be used in combination. The amount of the resin emulsion to be added in the pigment ink for ink-jet recording is not particularly limited and is, for example, 0 wt % to 30 wt %, 1 wt % to 20 wt %, 2 wt % to 15 wt %, relative to the total amount of the pigment ink for ink-jet recording.

The pigment ink for ink-jet recording may be prepared by uniformly mixing the pigment for ink-jet recording and other components to be added and removing an insoluble matter with a filter or the like, for example.

The pigment ink for ink-jet recording comprises the pigment for ink-jet recording and is thus superior in dispersibility. Therefore, as mentioned below, in an ink cartridge containing the pigment ink for ink-jet recording, generation of a precipitate (sedimentation of the pigment) is suppressed. Moreover, by the use of the pigment ink for ink-jet recording, the deposition of the pigment in an ink flow path of an ink-jet recording apparatus and the clogging of an ink-jet head by the pigment are suppressed.

An ink cartridge contains an ink, and the ink is the pigment ink. The pigment ink is superior in dispersibility, so that generation of the precipitate (sedimentation of the pigment) in the ink cartridge is suppressed. As a main body of the ink cartridge, a conventionally known main body may be used, for example.

The ink-jet recording apparatus and the ink-jet recording method are described below.

The ink-jet recording apparatus includes: an ink storing potion; and an ink ejection unit, an ink stored in the ink storing portion is ejected by the ink ejection unit, and the ink storing portion stores the pigment ink for ink-jet recording.

The ink-jet recording method includes: ejecting an ink to a recording medium by an ink-jet recording to record, and the pigment ink for ink-jet recording is used as the ink.

The ink-jet recording method may be performed using the ink-jet recording apparatus, for example. Examples of the recording include printing of letters and images and printing.

Figure 2:
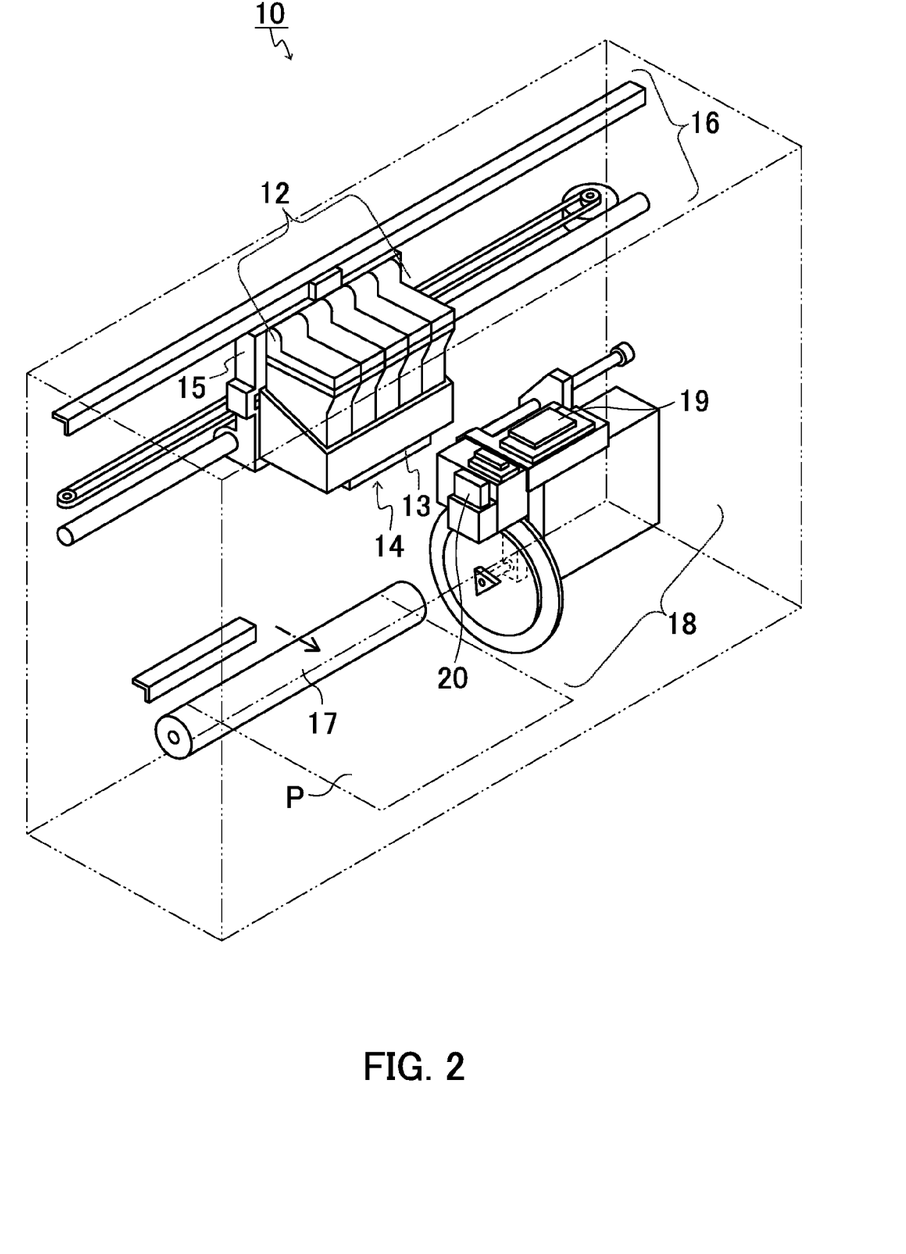
FIG. 2 is a schematic perspective view showing an example of the configuration of an ink-jet recording apparatus.

An ink-jet recording apparatus 10 of the present example shown in FIG. 2 is for use in recording on recording paper, a transparent sheet such as an OHP sheet, or the like. As shown in FIG. 2, this ink-jet recording apparatus 10 includes, as main components, five ink cartridges 12, an ink ejection unit (ink-jet head) 13, a head unit 14, a carriage 15, a drive unit 16, a platen roller 17, and a purge unit 18.

Each of the five ink cartridges 12 contains any one of the yellow, magenta, cyan, black, and white inks. For example, the white ink is the pigment ink for ink-jet recording. As the other inks, general inks may be used. The ink-jet head 13 set in the head unit 14 performs recording on a recording medium (for example, recording paper) P. The five ink cartridges 12 and the head unit 14 are mounted in the carriage 15. The drive unit 16 reciprocates the carriage 15 in a straight line direction. As the drive unit 16, a conventionally known drive unit may be used, for example (for example, see JP 2008-246821 A). The platen roller 17 extends in a reciprocating direction of the carriage 15 and is arranged so as to be opposed to the ink-jet head 13.

The purge unit 18 draws poor inks containing air bubbles and the like trapped inside the ink-jet head 13. As the purge unit 18, a conventionally known purge unit may be used, for example (for example, see JP 2008-246821 A).

On the platen roller 17 side of the purge unit 18, a wiper member 20 is arranged at a predetermined position so as to be adjacent to the purge unit 18. The wiper member 20 is formed into a spatula shape and wipes a nozzle-formed surface of the ink-jet head 13 with the movement of the carriage 15. In FIG. 2, a cap 19 covers a plurality of nozzles of the ink-jet head 13, which returns to the reset position after completion of the recording, in order to prevent the inks from drying.

The five ink cartridges 12 are mounted in one carriage 15 together with the head unit 14 in the ink-jet recording apparatus 10 of the present example. However, in the ink-jet recording apparatus 10, each of the five ink cartridges 12 may be mounted in a carriage that is different from a carriage in which the head unit 14 is mounted. Each of the five ink cartridges 12 may not be mounted in the carriage 15 and may be arranged and fixed in the ink-jet recording apparatus 10. In these aspects, for example, each of the five ink cartridges 12 and the head unit 14 mounted in the carriage 15 are linked via a tube or the like, and the ink is supplied from each of the five ink cartridges 12 to the head unit 14.

The ink-jet recording using this ink-jet recording apparatus 10 is performed as described below, for example. First, recording paper P is fed from a paper cassette (not shown) provided on or side of or under the ink-jet recording apparatus 10. Then, the recording paper P is introduced between the ink-jet head 13 and the platen roller 17. Thereafter, the introduced recording paper P is subjected to the predetermined recording with inks ejected from the ink-jet head 13. The pigment ink for ink-jet recording is superior in dispersibility. Thus, the user is not required to shake the ink cartridges 12 to stir the pigment ink for ink-jet recording. Moreover, by using the pigment ink for ink-jet recording, the deposition of the pigment in an ink flow path of the ink-jet recording apparatus 10 and the clogging of the ink-jet head 13 by the pigment are suppressed. The recording paper P after the recording is discharged from the ink-jet recording apparatus 10. Mechanisms of feeding and discharging the recording paper P are omitted in FIG. 2. The pigment ink for ink-jet recording is favorably used in formation of a white base layer at the time when a color recording is performed on a transparent sheet such as an OHP sheet.

In the apparatus shown in FIG. 2, a serial-type ink-jet head is employed. However, in the ink-jet recording apparatus, a line-type ink jet head may be employed.

Figure 3:
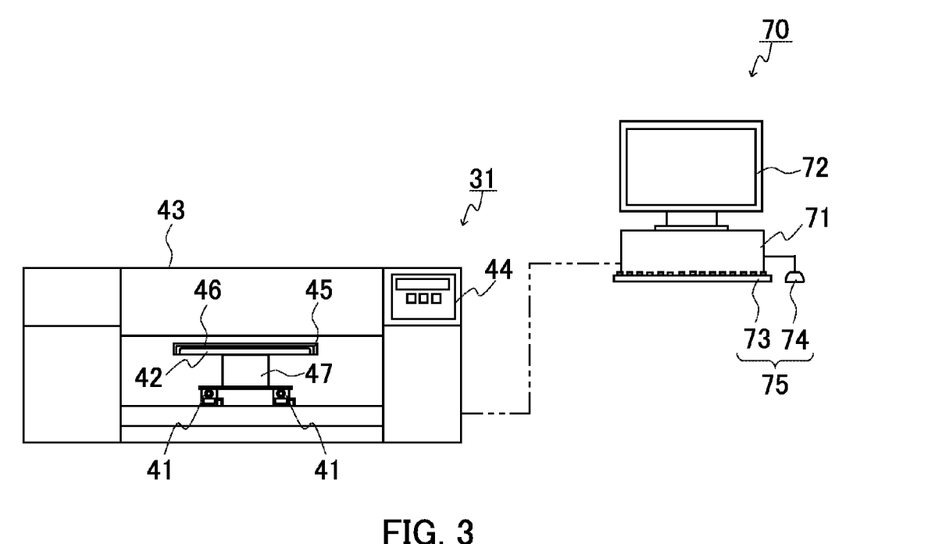
FIG. 3 is a schematic view showing another example of the configuration of an ink-jet recording apparatus.

An ink-jet recording apparatus 30 of the present example shown in FIG. 3 is for use in recording on fabric. As shown in FIG. 3, this ink-jet recording apparatus 30 is configured so that an ink-jet printer 31 that performs recording of the predetermined image on fabric by ejecting inks and a recording control unit 70 that acquires image data of the predetermined image and controls the ink-jet printer 31 via an interface.

Figure 4:
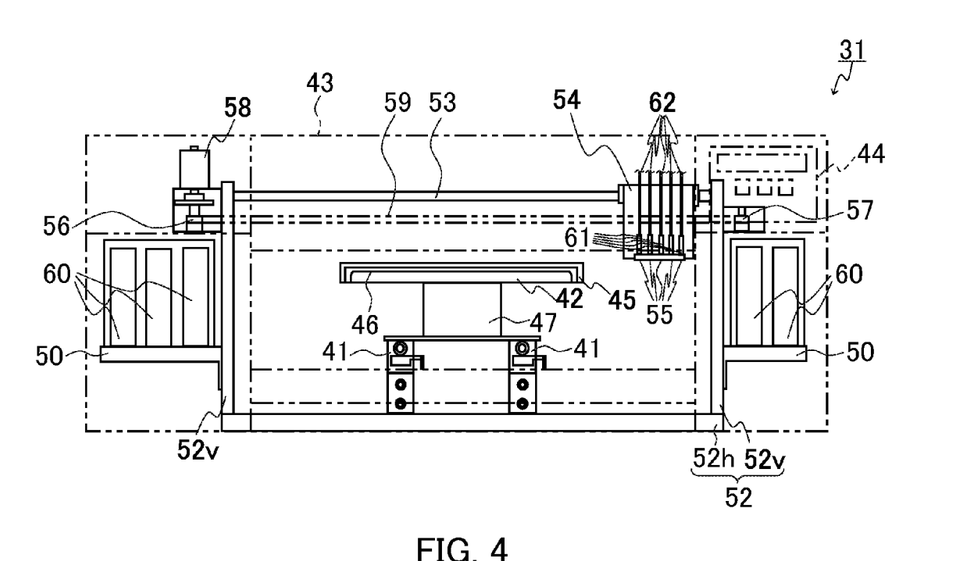
FIG. 4 is a front view showing an example of the configuration of an ink-jet printer in the ink-jet recording apparatus shown in FIG. 3.

As shown in FIG. 4, the ink-jet printer 31 is provided with a frame 52. The frame 52 includes a horizontal portion 52$h$ positioned on the bottom of the printer 31 and two vertical portions 52$v$ extending perpendicularly to and upward from the respective ends of the horizontal portion 52$h$. In FIG. 4, identical parts to those in FIG. 3 are indicated by identical reference numerals, and the same applies to the subsequent figures.

A slide rail 53 is supported in such a manner that the upper portions of the respective two vertical portions 52$v$ are mutually linked. A carriage 54 is mounted on the side rail 53 slidably in a longitudinal direction (main scanning direction) of the slide rail 53. The lower surface of this carriage 54 is provided with five piezoelectric ink-jet heads (ink ejection units) 55 arranged at the respective predetermined positions in order to eject five color inks.

Pulleys 56 and 57 are supported on the upper portions of the respective two vertical portions 52$v$, and a motor shaft of a motor 58 supported by the vertical portion 52$v$ is linked to the pulley 56. An endless belt 59 is extended between the pulleys 56 and 57, and the carriage 54 is fixed to an appropriate portion of this endless belt 59.

With such configuration, the carriage 54 reciprocates linearly along the longitudinal direction (main scanning direction) of the slide rail 53 as the motor 58 rotates the pulley 56 in the normal or reverse direction, and consequently the ink-jet heads 55 reciprocate.

The respective mounting portions 50 that detachably mount ink cartridges 60 are formed on the two vertical portions 52$v$. Among the two mounting portions 50, one may hold two color ink cartridges 60, and the other may hold three color ink cartridges 60, and the ink bags (not shown) formed inside the respective ink cartridges 60 are connected to the respective five ink tanks 61 positioned in the upper parts of the ink-jet heads 55 via flexible tubes 62. The five ink tanks 61 are in communication with the respective ink-jet heads 55 as described below, so that the inks are supplied from the respective ink cartridges 60 to the respective ink-jet heads 55.

A slide mechanism 41 is provided on the horizontal portion 52$h$ of the frame 52, and a platen (support) 42 is supported on the slide mechanism 41. This platen 42 is provided with a fixing frame (fixing unit) 45 so that fabric is set to a position at which a portion on which recording is performed faces up in a flat state without creases. Although the ink-jet printer 31 of the present example performs ink-jet recording on a T-shirt that has been sewed, it may be applied to fabric in general. Further, although the number of platens 42 is one in the ink-jet printer 32 of the present example, the number is not limited to one and may be increased if necessary. For example, by using the ink-jet printer having two platens, fixation of a T-short to one of the platens may be performed while an image is recorded on another T-shirt fixed on another platen. Therefore, working efficiency may be increased.

Further, a platen moving mechanism (not shown) is arranged at a predetermined position in order to reciprocate the platen 42 in a direction perpendicular to the paper surface in FIG. 4 (the sliding direction of the slide mechanism 41, which forms an auxiliary scanning direction of the ink-jet printer 31). A rack, a pinion mechanism, a mechanism using an endless belt, or the like may be employed as the platen moving mechanism.

Figure 5A:
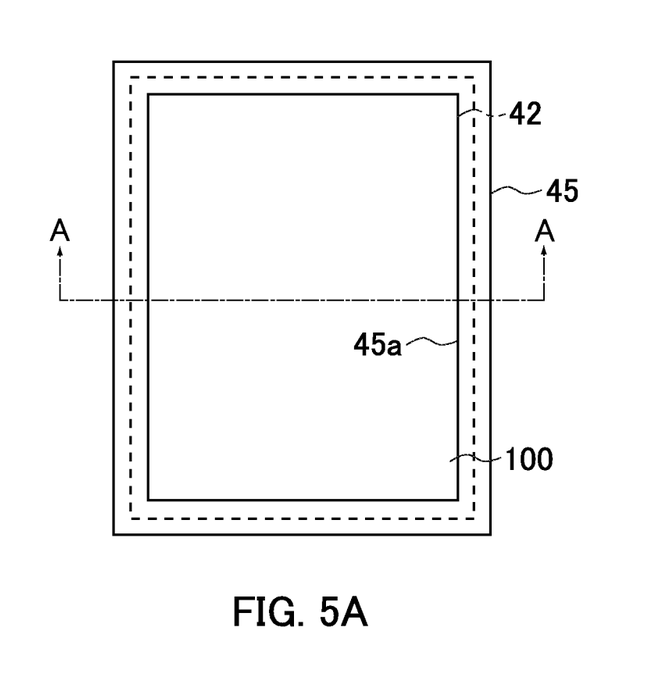
FIG. 5A is a plan view showing the state where fabric is set to a platen of the ink-jet recording apparatus shown in FIG. 3.
Figure 5B:
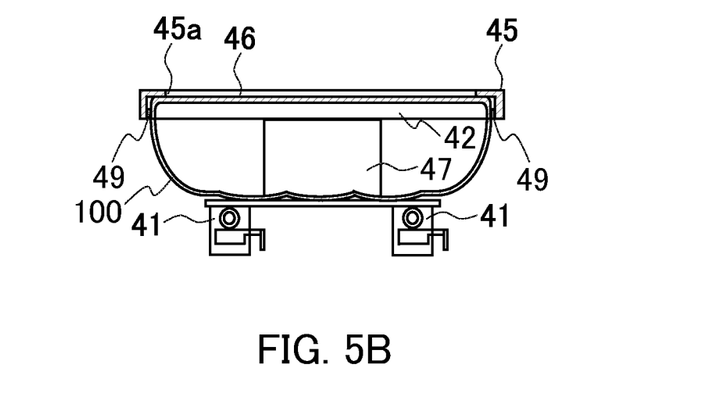
FIG. 5B is a cross-sectional view taken along line A-A of FIG. 5A.

FIGS. 5A and 5B show the state where fabric is set on a platen. FIG. 5A is a plan view, and FIG. 5B is a cross-sectional view taken along the line A-A of FIG. 5A. As shown in FIGS. 5A and 5B, the platen 42 is a rectangle having the longitudinal direction in a direction orthogonal to the reciprocating direction of the carriage 54 from the planner view and includes a support surface 46 that supports a T-shirt 100. The lower surface of the platen 42 at the farthest side in a direction perpendicular to the paper surface in FIG. 5B is linked to the slide mechanism 41 at the facing position via a support member 47. Further, each of upper parts of both ends of the platen 42, parallel with the longitudinal direction, has an arc shape.

The fixing frame 45 is configured so that a frame having a L-shaped cross section covers the four sides of the support surface 46 of the platen 42. An opening 45a having an opening area slightly smaller than the area of the support surface 46 of the platen 42 is formed on the surface facing the support surface 46 of the platen 42 in the fixing frame 45. Further, the inner surface of the fixing frame 45 facing the side surface of the platen 42 is provided with an anti-slipping member 49 made of rubber. This anti-slipping member 49 allows the T-shirt 100 to be set in the state where the T-shirt is stretched in two directions of the longitudinal direction (longitudinal direction of the T-shirt 100) and the short direction (short direction of the T-shirt 100) of the support surface 46 of the platen 42 and allows the T-shirt 100 to be held without creases in the case where the T-shirt 100 is set on the platen 42. At the time of setting the T-shirt 100 on the platen 42, the T-shirt 100 is set from the hem side in such a manner that the T-shirt covers the support surface 46 of the platen 42 and is fixed with the fixing frame 45. Further, the fixing frame 45 is provided rotatably by a rotation portion (not shown) provided at the end portion of the platen 42, positioned at the farthest side in a direction perpendicular to the paper surface in FIG. 5B, and the T-shirt 100 is fixed between the platen 42 and the fixing frame 45 by rotating the fixing frame 45 so as to fit to the platen 42 after covering the platen 42 with the T-shirt 100.

The ink-jet printer 31 is provided with a cover 43, and the cover 43 covers the ink-jet heads 55, the slide mechanism 41, and the like to protect them. Note here that the cover 43 is perspectively illustrated by chain double-dashed lines in FIG. 4 in order to show the inside of the cover 43 in detail. An operation panel 44 provided with a liquid crystal panel and operation buttons is arranged at a predetermined position of the right upper portion of the front cover 43.

The five ink-jet heads 55 shown in FIG. 4 correspond to the respective five color inks (yellow, magenta, cyan, black, and white), are arranged in parallel along the reciprocating direction of the carriage 54, and are in communication with the respective ink cartridges 60 via the flexible tubes 62 and the ink tanks 61. For example, the white ink is the pigment ink for ink-jet recording. The other inks may be inks in general. As the configuration for supplying inks to the ink-jet heads, a conventionally known configuration may be employed, for example (for example, see JP 2004-291461 A). As to the five ink-jet heads 55, a head unit including ejection units that eject the respective four color inks (yellow, magenta, cyan, and black) and a head unit including an ejection unit that ejects a white ink may be arranged in a direction orthogonal to the reciprocating direction of the carriage 54.

The above-described linkage of the ink cartridges 60 and the ink tanks 61 via the flexible tubes 62 allows the inks in the ink cartridges 60 to be supplied to the ink tanks 61 and allows the ink cartridges 60 to be provided at the positions where they are easily exchangeable. Therefore, when the inks in the ink cartridges 60 run out, the ink cartridges 60 may be easily changed.

The ink-jet heads 55 are arranged so as to form a small gap between the lower surfaces and the support surface 46 of the platen 42, and a portion to be recorded of the T-shirt 100 set on the platen 42 is fed to the gap when an image is recorded on the T-shirt 100. With this configuration, by reciprocating the ink-jet heads 55 by the carriage 54 while ejecting each of the color inks from plural ejection nozzles with micro-diameters formed on the bottom surfaces of the ink-jet heads 55 on the T-shirt 100, a desired color image may be recorded on the T-shirt.

The recording control unit 70 shown in FIG. 3 is, for example, configured using a general-purpose personal computer (PC) and includes a main body 71, a display as a display section 72, and a keyboard 73 and a mouse (pointing device) 74 as an operation section 75.

Figure 6:
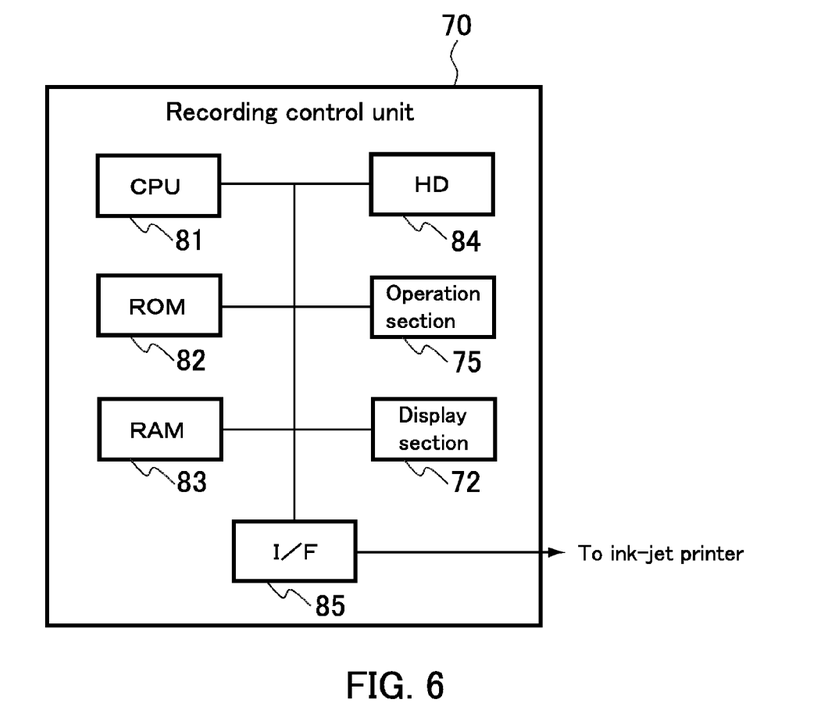
FIG. 6 is a block diagram showing the configuration of a recording control unit of the ink-jet recording apparatus shown in FIG. 3.

FIG. 6 is a block diagram showing a configuration of the recording control unit 70 shown in FIG. 3. The recording control unit 70 includes a CPU (Central Processing Unit) 81, a ROM (Read Only Memory) 82, a RAM (Random Access Memory) 83, an HD (Hard Disk) 84, an operation section 75, a display section 72, and an interface (I/F) 85, and they are connected via a bus. The CPU 81, the ROM 82, the RAM 83, and the HD 84 are incorporated into the main body 71 of the recording control unit 70, and the operation section 75 is composed of the keyboard 73 and the mouse 74.

The HD 84 stores various programs for use in control of the operation of the recording control unit 70. The HD 84 further stores various image data produced by software and various data according to the kind of fabric such as T-shirt. The CPU 81 performs various operations and processes on the basis of signals input with the operation section 75 and various programs and data stored in the ROM 82, the RAM 83, and the HD 84. Then, data and the like are sent to the ink-jet printer 31 via the interface 85. The RAM 83 is a volatile storage device which is readable and writable and stores results of the various operations and the like obtained in the CPU 81. The interface 85 is connected to an interface of the ink-jet printer 31 and allows the printing control apparatus 70 and the ink-jet printer 31 to communicate with each other.

Figure 7:
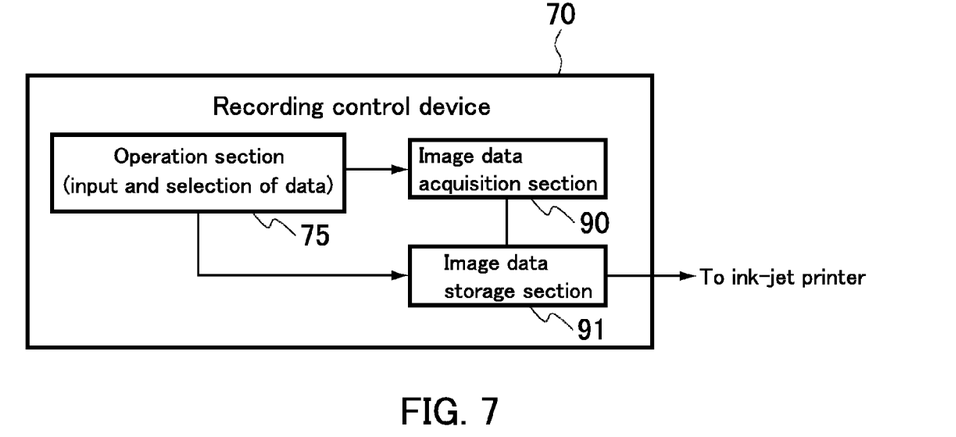
FIG. 7 is a functional block diagram of the recording control unit of the ink-jet recording apparatus shown in FIG. 3.

FIG. 7 is a functional block diagram of the recording control unit 70. As shown in FIG. 7, the recording control unit 70 includes an image data acquisition section 90 and an image data storage section 91. In the present example, the image data acquisition section 90 is realized by the CPU 81, and the image data storage section 91 is composed of the RAM 83 and/or the HD 84.

The image data acquisition section 90 has a known function for use in production of image data and produces various image data on the basis of signals input from the keyboard 73 or the mouse 74 by an operator. The image data storage section 91 stores image data collected from removable storage media such as a CD-ROM, an FD, and an MO and the Internet and image data acquired by the image data acquisition section 90.

A desired image is recorded on a T-shirt 100 using the ink-jet recording apparatus 30 of the present example as follows, for example. First, image data desired to be recorded on a T-shirt 100 are acquired using a keyboard 73 and a mouse 74 of a PC. In the acquisition of the image data, image data is produced using software installed in the PC, or image data previously stored in a HD 84 is selected.

Then, the T-shirt 100 is fixed on a platen 42. That is, the T-shirt 100 is overlaid on the platen 42 from the hem of the T-shirt 100 and is fixed with a fixing frame 45 along a supporting surface 46 of the platen 42 without creases.

Subsequently, when an operator instructs that recording is performed, the image data is sent to an ink-jet printer 31 via an interface 85, inks are ejected from ink-jet heads 55 on the basis of the image data, and the T-shirt 100 fixed on the platen 42 is subjected to recording. As in the apparatus shown in FIG. 2, the pigment ink for ink-jet recording is superior in dispersibility. Thus, the user is not required to shake the ink cartridges 60 to stir the pigment ink for ink-jet recording. Moreover, by using the pigment ink for ink-jet recording, the deposition of the pigment in an ink flow path of the ink-jet printer 31 and the clogging of the ink-jet heads 55 by the pigment are suppressed. The pigment ink for ink-jet recording is favorably used in formation of a white base layer at the time when color recording is performed on a deep color fabric.

Examples

The examples are described below. The present invention, however, is not limited by the following examples.

As a pigment for ink-jet recording, porous silica ($SiO_2$) particles coated with an inorganic pigment layer containing titanium oxide ($TiO_2$) were produced.

That is, first, 5.0 g of calcium carbonate having a particle size of 500 nm was weighed, and 18.00 ml of distilled water and 150.00 ml of ethanol were added thereto. The resultant mixture was then stirred with ultrasound for 10 minutes.

Then, 15.0 ml of 25% aqueous ammonia solution and 4.0 ml of TEOS were added to the obtained dispersion liquid of the calcium carbonate, and the resultant mixture was refluxed at 50° C. for 2 hours.

Thereafter, the solution after the reflux was subjected to centrifugal separation, and the obtained precipitate was washed with ethanol. Then, the calcium carbonate was dissolved and removed with 3 mol/l hydrochloric acid. The precipitate was then again subjected to centrifugal separation, and the obtained precipitate was washed with ethanol and dried at 90° C. for 24 hours.

Subsequently, 1.0 ml of distilled water, 40 ml of ethanol, and 0.066 g of polyvinyl pyrolidone were added to the obtained porous $SiO_2$ particle, which was then stirred with ultrasound for 15 minutes.

Then, 40 ml of ethanol and tetrabutoxy titanium (TBOT) were added to a dispersion liquid of the obtained porous $SiO_2$ particle, which was then stirred with ultrasound for 1 hour. By changing the charge amount of TBOT relative to the porous $SiO_2$ particle, the thickness of the $TiO_2$ film (the thickness of the inorganic pigment layer) was controlled. By increasing the charge amount of TBOT, the thickness of the $TiO_2$ film (the thickness of the inorganic pigment layer) is increased.

Subsequently, the solution after the stirring with ultrasound was subjected to centrifugal separation, and the obtained precipitate was then washed with ethanol and thereafter dried at 90° C. for 24 hours. Thereafter, the precipitate was fired at 550° C. for 3 hours. Thus, porous $SiO_2$ particles (pigments A to J) coated with an inorganic pigment layer containing $TiO_2$ were obtained.

Various physical properties of the pigments A to J were measured by the following methods.

Thickness of $TiO_2$ film (Thickness of the inorganic pigment layer) The thickness of the $TiO_2$ film was determined by actual measurement using a scanning electron microscope.

Particle Size (Diameter)

The particle size was determined by dynamic light scattering using Microtrac UPA-EX150 manufactured by NIKKISO CO., LTD.

$SiO_2/TiO_2$ (Weight Ratio)

The $SiO_2/TiO_2$ was determined by actual measurement using a scanning electron microscope (EDS: energy dispersive X-ray spectrometry).

Density

The density was measured using Micro-Ultrapycnometer 1000 manufactured by Malvern.

Sedimentation Velocity in Solvent

The sedimentation velocity in a solvent (water) was measured by centrifugal separation using LUMiSizer 610 manufactured by LUM.

Brightness (L*)

10 wt % of any of the pigments A to J, 15 wt % of a binder resin (MOWINYL (registered trademark) 6960, manufactured by Nippon Synthetic Chemical Industry Co., Ltd.), 20 wt % of a humectant (glycerin), and 50 wt % of water were uniformly mixed. Thus, each paint was prepared. Subsequently, the paint was drawn down onto a PET (polyethylene terephthalate) film using a bar coater #5, and the brightness (L*) was measured using a colorimeter.

The measurement results of various physical properties of the pigments A to J are summarized in Table 1.

TABLE 1

|  | $TiO_2$ film thickness (nm) | Particle size (nm) | $SiO_2/TiO_2$ (weight ratio) | Densiy (g/cm³) | Sedimentation velocity (cm/hr) | Brightness (L*) | Sedimentation velocity of Comparative pigment (cm/hr) | Sedimentation velocity ratio to Comparative pigment |
|---|---|---|---|---|---|---|---|---|
| Pigment A | 4 | 508 | 6.530 | 1.5 | 0.025 | 54.2 | 0.166 | 0.151 |

TABLE 1-continued

|  | TiO$_2$ film thickness (nm) | Particle size (nm) | SiO$_2$/TiO$_2$ (weight ratio) | Densiy (g/cm$^3$) | Sedimentation velocity (cm/hr) | Brightness (L*) | Sedimentation velocity of Comparative pigment (cm/hr) | Sedimentation velocity ratio to Comparative pigment |
|---|---|---|---|---|---|---|---|---|
| Pigment B | 10 | 520 | 2.551 | 1.7 | 0.036 | 59.3 | 0.173 | 0.209 |
| Pigment C | 21 | 542 | 1.163 | 2.0 | 0.057 | 63.9 | 0.188 | 0.301 |
| Pigment D | 25 | 550 | 0.962 | 2.1 | 0.064 | 69.2 | 0.194 | 0.331 |
| Pigment E | 30 | 560 | 0.787 | 2.2 | 0.074 | 72.5 | 0.201 | 0.367 |
| Pigment F | 44 | 588 | 0.508 | 2.5 | 0.100 | 76.3 | 0.222 | 0.453 |
| Pigment G | 64 | 628 | 0.325 | 2.8 | 0.139 | 77.3 | 0.253 | 0.551 |
| Pigment H | 80 | 660 | 0.245 | 3.0 | 0.171 | 78.1 | 0.279 | 0.613 |
| Pigment J | 97 | 694 | 0.190 | 3.2 | 0.206 | 78.8 | 0.309 | 0.667 |

As summarized in Table 1, as can be seen from the fact that the pigments A to J had low sedimentation velocities in a solvent compared with the comparative pigments having the same TiO$_2$ film thicknesses and the same particle sizes as the pigments A to J, in which pore openings of the porous SiO$_2$ particles were completely filled with TiO$_2$, the pigments A to J are superior in dispersibility in a solvent. Specifically, as can be seen from the fact that the pigments B to G having densities of 1.7 g/cm$^3$ to 2.8 g/cm$^3$ had the sedimentation velocities of about ½ or less, compared with the comparative pigments, the pigments B to G are more superior in dispersibility in a solvent. Moreover, as can be seen from the fact that the pigments B to G had L* of about 60 or more, the pigments B to G are more superior in also brightness.

It will be obvious to those having skill in the art that many changes may be made in the above-described details of the particular aspects described herein without departing from the spirit or scope of the invention as defined in the appended claims.

The invention claimed is:

1. A pigment for ink-jet recording, comprising:
a porous particle;
a sealing agent; and
an inorganic pigment layer comprising an inorganic pigment, wherein
the sealing agent is arranged in a pore opening of the porous particle,
a size of the sealing agent is smaller than a size of the pore opening, and
the inorganic pigment layer is formed on a surface of the porous particle.

2. The pigment for ink-jet recording according to claim 1, wherein
the inorganic pigment is at least one selected from the group consisting of titanium oxide, sulfate of alkali earth metal, carbonate of alkali earth metal, silica, calcium silicate, alumina, hydrated alumina, zinc oxide, talc, and clay.

3. The pigment for ink-jet recording according to claim 1, wherein
the inorganic pigment comprises titanium oxide.

4. The pigment for ink-jet recording according to claim 1, having a density of 1.7 g/cm$^3$ to 2.8 g/cm$^3$.

5. The pigment for ink-jet recording according to claim 1, wherein
the porous particle is at least one selected from the group consisting of a porous silicon oxide particle, a porous alminosilicate particle, a porous aluminium oxide particle, a porous zirconium oxide, and active carbon.

6. The pigment for ink-jet recording according to claim 1, wherein
the porous particle is a porous silica particle.

7. The pigment for ink-jet recording according to claim 1, wherein
the sealing agent is a chemical compound of organic silicon.

8. The pigment for ink-jet recording according to claim 1, wherein
the pore opening is a concave portion formed from the surface of the porous particle toward a center, and
the sealing agent is arranged inside the pore opening.

9. The pigment for ink-jet recording according to claim 8, wherein
a plurality of the sealing agents are arranged inside the pore opening.

10. A pigment for ink-jet recording, comprising:
a porous particle;
a sealing agent; and
an inorganic pigment layer comprising an inorganic pigment, wherein
the sealing agent is an organic silicon compound,
the inorganic pigment layer is formed on a surface of the porous particle,
the sealing agent is arranged in a pore opening of the porous particle, and
the inorganic pigment is not present in the pore opening of the porous particle inside the inorganic pigment layer.

11. The pigment for ink-jet recording according to claim 10, wherein
the pore opening is a concave portion formed from the surface of the porous particle toward a center, and
the sealing agent is arranged inside the pore opening.

12. The pigment for ink-jet recording according to claim 11, wherein
a plurality of the sealing agents are arranged inside the pore opening.

13. A pigment ink for ink-jet recording comprising the pigment for ink-jet recording according to claim 1.

14. The pigment ink for ink-jet recording according to claim 13, further comprising a resin emulsion, wherein
the pigment ink is used for forming an image on fabric.

15. The pigment ink for ink-jet recording according to claim 14, wherein
the resin emulsion comprises at least one of an acryl resin emulsion and an urethane resin emulsion.

\* \* \* \* \*